(12) United States Patent
Cherfane et al.

(10) Patent No.: US 7,156,120 B2
(45) Date of Patent: Jan. 2, 2007

(54) INLINE LIQUID FLOW CONTROL VALVE

(75) Inventors: Raymond C. Cherfane, Acworth, GA (US); Lloyd W. Hitt, Deland, FL (US)

(73) Assignee: CCT Manufacturing, Inc., Acworth, GA (US)

( * ) Notice: Subject to any disclaimer, the term of this patent is extended or adjusted under 35 U.S.C. 154(b) by 259 days.

(21) Appl. No.: 10/900,486

(22) Filed: Jul. 28, 2004

(65) Prior Publication Data

US 2006/0021657 A1 Feb. 2, 2006

(51) Int. Cl.
*G05D 7/01* (2006.01)
(52) U.S. Cl. ...................... 137/504; 137/556
(58) Field of Classification Search ............... 137/500, 137/501, 502, 503, 504, 556
See application file for complete search history.

(56) References Cited

U.S. PATENT DOCUMENTS

| | | | |
|---|---|---|---|
| 334,011 A * | 1/1886 | Franklin | 137/503 |
| 371,063 A * | 10/1887 | Hayes | 137/503 |
| 2,646,078 A | 7/1953 | Adams | |
| 2,881,794 A * | 4/1959 | Baldwin et al. | 137/501 |
| 3,015,341 A | 1/1962 | Hedland et al. | |
| 3,130,747 A | 4/1964 | Benaway | |
| 3,145,730 A | 8/1964 | Presnell | |
| 3,339,580 A | 9/1967 | Cutler et al. | |
| 3,412,752 A * | 11/1968 | Gordon et al. | 137/504 |
| 3,590,847 A | 7/1971 | Worden et al. | |
| 3,643,685 A | 2/1972 | Hays | |
| 3,805,824 A | 4/1974 | Robbins, Jr. | |
| 4,080,993 A | 3/1978 | Lind, Jr. | |
| 4,237,922 A | 12/1980 | Maier | |
| 4,728,075 A | 3/1988 | Paradis | |
| 4,848,403 A | 7/1989 | Pilolla et al. | |
| 4,995,422 A | 2/1991 | Chew et al. | |
| 5,878,766 A | 3/1999 | Dekhtyar | |
| 6,129,112 A | 10/2000 | Huthmann et al. | |
| 6,213,144 B1 | 4/2001 | Moore | |
| 6,688,319 B1 | 2/2004 | Trantham et al. | |

* cited by examiner

*Primary Examiner*—Stephen M. Hepperle
(74) *Attorney, Agent, or Firm*—Vedder, Price, Kaufman & Kammholz

(57) ABSTRACT

An inline liquid flow control valve includes an intake fitting member with a bottom portion having a bottom portion threaded section and a liquid flow section having apertures. The valve further includes an outlet fitting member with a top portion having a liquid outlet section with apertures. A top portion threaded section of the outlet fitting member engages a bottom portion threaded section of the intake fitting member with a compression member disposed therebetween. The compression member engaging a piston disposed internally within the intake fitting member. The apertures in the intake fitting member, apertures in the piston, an annular sleeve and the plurality of apertures in the outlet fitting member define a liquid flow chamber. A flow rate of liquid through the liquid flow chamber is inlinely adjustable and maintainable using an internally disposed compression member.

22 Claims, 4 Drawing Sheets

INLINE LIQUID FLOW CONTROL VALVE

BACKGROUND

The present invention relates generally to liquid flow control and more specifically to the adjustment and control of a liquid flow rate using an inline liquid flow control valve to maintain a constant flow rate under varying incoming fluid pressure.

In existing manufacturing environments, an important element is the regulation of the flow of material, such as a liquid. Inline valve flow control systems allow users to effectively regulate the flow of a liquid within an existing system, based on the adjustment of the valve. Adjusting the valve therein adjusts the liquid flow rate.

The liquid flow rate is important for regulating mixing ratios in a manufacturing process with multiple liquids. For example, multiple inline flow control valves are utilized in an industrial environment using multiple chemicals. A resultant mix ratio is generated based on the adjusted flow control for each of the chemicals.

When a new mix ratio is required, existing inline flow control valves require significant modifications. Current systems require removal of the valve. As the flow control valve is inline, the pipeline is disabled and the valve is fully disconnected from the pipeline. The flow control valve is then manually adjusted and then reconnected into the pipeline. In one common technique, a fixed flow rate valve includes an internal set screw, wherein the internal set screw allows for the increase or decrease of a flow rate, within the range limits of the valve.

Upon reconnection, the pipeline is enabled and then the flow rate of the liquid through the flow control valve is measured. If the flow rate is incorrect, the process must be repeated until correct. Therefore, the pipeline is disabled, the flow control valve removed and reconnected and the pipeline re-enabled until the flow rate is correct. The current system is extremely inefficient. The current inline flow control valves also fail to include specific marking for adjusting the flow rate. Therefore, the adjustment process must be done by a "trial and error" approach until the flow rate is at the right rate, within a prescribed tolerance range.

The existing solution for inline flow control valves require extensive down time for a manufacturing system. If the system includes multiple chemical ingredients with a specific mix rate, the process if further complicated by the proper adjustment of all inline flow control valves for the multiple chemicals. Therefore, as manufacturing systems become more complicated, adjustments in various liquid flow controls become problematic. For example, urethane chemical mix ratios are becoming broader in range and the existing flow control valves are limited in flow range and ratio capabilities.

As such, there exists a need for an inline flow control valve capable of being readily adjustable within an existing pipeline.

BRIEF DESCRIPTION OF THE DRAWINGS

Certain embodiments are shown in the drawings. However, it is understood that the present disclosure is not limited to the arrangements and instrumentalities shown in the attached drawings, wherein.

DETAILED DESCRIPTION

Figure 1:
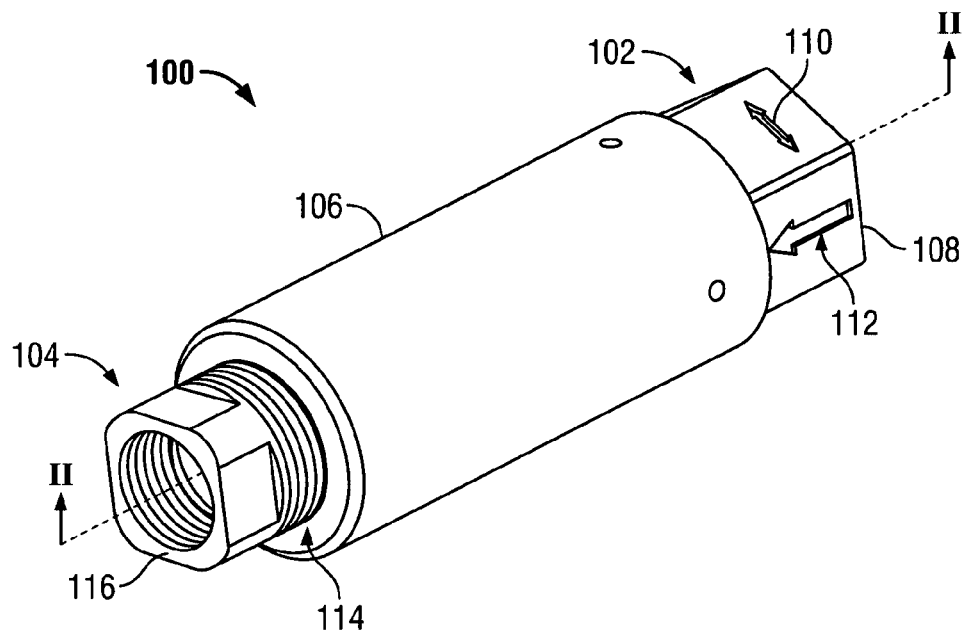
FIG. 1 illustrates a perspective view of an inline liquid flow control valve.

For the purposes of promoting an understanding of the principles disclosed herein, reference will now be made to the preferred embodiments illustrated in the drawings and specific language will be used to describe the same. It will nevertheless be understood that no limitation of the scope is thereby intended, such alterations and further modifications in the illustrated device, and such further applications of the principles disclosed as illustrated therein being contemplated as would normally occur to one skilled in the art to which this disclosure relates.

An inline liquid flow control valve having an intake fitting member includes a top portion and a bottom portion. The bottom portion of the intake fitting member includes a bottom portion threaded section and a liquid flow section having apertures disposed thereon.

The inline liquid flow control valve further includes an outlet fitting member having a top portion with a liquid outlet section having apertures disposed thereon. The top portion of the outlet fitting member includes a top portion threaded section. The top portion threaded section engages the bottom portion threaded section of the intake fitting member.

The inline liquid flow control valve further includes an annular sleeve disposed about the intake fitting member and the outlet fitting member. The inline liquid flow control valve further includes a sliding piston having an orifice port disposed on a face portion and a plurality of apertures on a bottom portion. The sliding piston rests against a shoulder inside the intake fitting member, due to compressive forces exerted by a compression member disposed between the bottom of the piston and machined cavity in the outlet fitting member. The multiple apertures in the intake fitting member and the plurality of apertures in the sliding piston bottom define a liquid flow chamber. A flow rate of liquid through the liquid flow chamber is inlinely adjustable through the positioning of the sliding piston relative to the plurality of apertures in the intake fitting member. Furthermore, the higher the incoming fluid pressure entering the intake fitting member, the higher the fluid forces are on the face of the sliding piston. These forces are opposed by higher spring compression forces to keep the sliding piston in a set position for a constant flow rate. More specifically, the intake fitting member, upon engagement with the outlet fitting member, laterally displaces the sliding piston at a given incoming fluid pressure, thus giving a new position of the piston and thereby adjusting the liquid flow passageways in relationship to the plurality of apertures in the intake fitting member, thus adjusting the liquid flow rate.

The inline liquid flow control valve allows for the adjustment of the flow rate of liquid through the liquid flow chamber without removing the liquid flow control valve from a pipeline. Through the adjustment of the orientation of the intake fitting member relative to the outlet fitting member, the inline liquid flow control allows for adjustment of the flow rate to be performed while the valve is maintained inline within the pipeline.

FIG. 1 illustrates one embodiment of an inline liquid flow control valve 100 including a intake fitting member 102, an outlet fitting member 104 and an annular sleeve 106. Visible in FIG. 1, the intake fitting member 102 has a top portion 108 that extends beyond the annular sleeve 106. The top portion 108, in one embodiment, has a polygonal shape having multiple faces. As discussed in further detail below, the top portion 108 is rotatable about a central axis, in a direction indicated by the arrow 110. Upon rotation of the top portion 108, the top portion 108 is laterally displaced along the lateral axis, in relationship to fitting member 104, in a direction illustrates by arrow 112.

During flow of a certain rate, lateral displacement of the top portion 108 laterally displaces a sliding piston (not visible in FIG. 1) disposed interior to the annular sleeve 106. The lateral displacement of the sliding piston may be relatively measured by multiple adjustment markings 114 on a bottom portion 116 of the outlet fitting member 104, as discussed in further detail below. The sliding piston (not visible in FIG. 1) is discussed in greater detail below with regards to FIG. 2.

Figure 2:
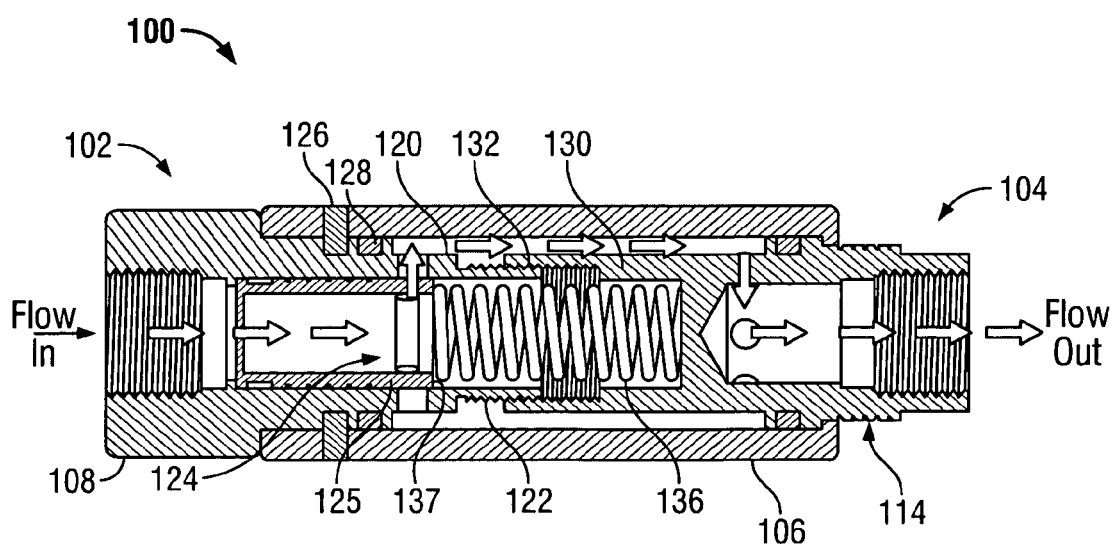
FIG. 2 illustrates a cross-sectional view of the inline liquid flow control valve of FIG. 1 along the cross section II—II.

FIG. 2 illustrates a cross-sectional view of the inline liquid flow control valve 100 of FIG. 1 along the cross-section II—II. The inlet fitting member 102 includes the top portion 108 and a bottom portion 120. The bottom portion 120 includes a bottom portion threaded section 122 and a liquid flow section 124. The liquid flow section 124 includes apertures (not visible) for the flow of liquid therethrough. The liquid flow section 124 is disposed within a piston 125, wherein the piston 125 is slideable within the an inner cavity of the intake fitting member 102. As discussed in further detail below with regards to FIGS. 5 and 6, the piston 125 includes a primary face having an aperture such that liquid may pass into the liquid flow section 124. The piston 125 further includes bottom portion apertures such that the liquid flow may pass outside of the piston 125.

In one embodiment, the annular sleeve 106 includes engagement means 126 for contacting engagement with the intake fitting member 102. The intake fitting member 102 may further include sealing means 128 for engaging the annular sleeve 106. In one embodiment, the engagement means 126 and sealing means 128 may be o-rings or any other suitable element circumferentially extending around the annular sleeve engaging the intake fitting member 102.

The outlet fitting member 104 includes a top portion 130 having a top portion threaded section 132. The top portion threaded section 132 is internally disposed within the top portion 130 of the outlet fitting member 104. The top portion threaded section 132 engages the bottom portion threaded section 122 of the intake fitting member 102. The engagement of the threaded sections 122 and 132 secure the intake fitting member 102 relative to the outlet fitting member 104. The outlet fitting member 104 further includes a plurality of apertures 156 disposed on the bottom portion 116, as shown in greater detail in FIGS. 7 and 8.

Moreover, the engagement of the threaded sections 122 and 132 allow for the definition of a liquid flow chamber 134, as indicated in FIG. 2. The liquid flow chamber 134 consists of the channel defined by an inlet portion of the intake fitting member 102, bottom portion apertures of the piston 125, a channel between the annular sleeve 106 and the engaged fitting members 102 and 104, and an outlet portion of the outlet fitting member 104. The liquid flow chamber 134 utilizes the apertures within the liquid flow section 124 of the intake fitting member 102 to provide liquid flow between the inlet portion and the channel defined by the annular sleeve. The liquid flow chamber 134 also utilizes the apertures (not visible) within the bottom portion 116 to provide liquid flow between the channel defined by the annular sleeve and an outlet portion of the outlet fitting member.

The inline liquid flow control valve 100 further includes a compression member 136, such as a spring. The compression member 136 is disposed between a bottom portion 137 of the piston 125 and the top portion 130 of the outlet fitting member 104. When the threaded portions 122 and 132 are engaged, the compression member 136 is compressed, thereupon providing a compression force against both the piston 125 and the outlet fitting member 104. As discussed in further detail below, the piston 125 abuts a shoulder portion of the inlet fitting member 102 when no liquid flow is present and is compressed by pressure generated when liquid flow is present.

The compression member 136 allows for an internal compression force to maintain the liquid flow rate based on maintaining the liquid flow chamber 134 and the disposition of the bottom portion apertures in the piston to apertures on the bottom portion of the intake fitting member, as discussed further below with respect to FIGS. 3 and 4. As the inline liquid flow control valve 100 utilizes the intake fitting member 102 and the outlet fitting member 104 in a male/female fitting relationship, the compression member 136 maintains the integrity of pressure compensation principals.

Figure 3:
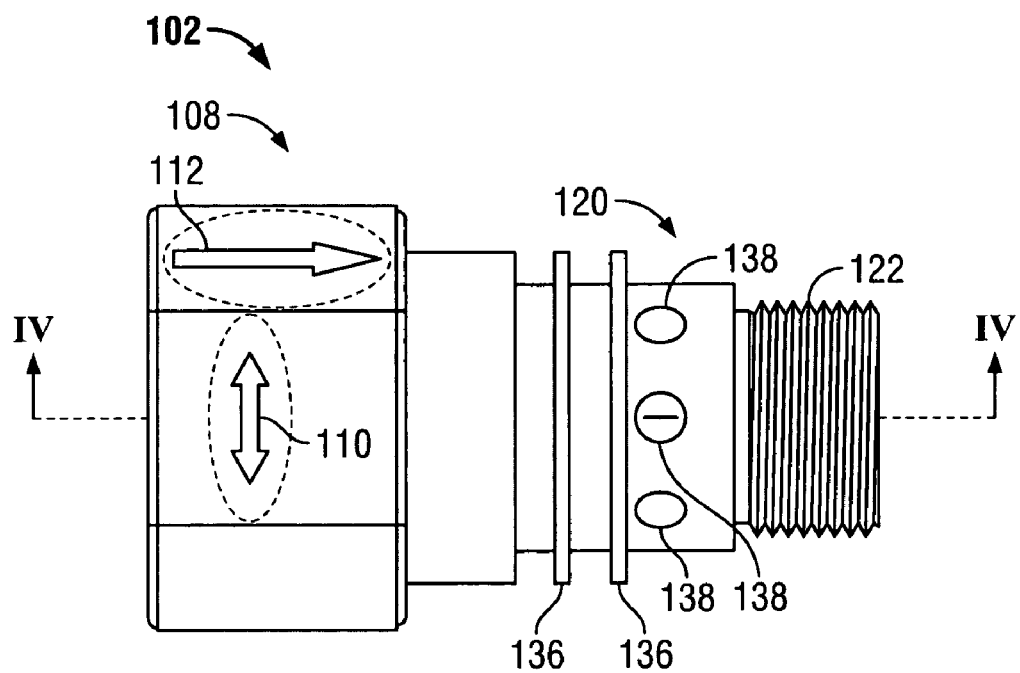
FIG. 3 illustrates a side view of an intake fitting member.

FIG. 3 illustrates a side view of one embodiment of the intake fitting member 102 having the top portion 108 and the bottom portion 120. Illustrated in FIG. 3, the top portion 108 has a polygonal shape for rotational movement in the direction noted by the arrow 110. Upon rotation in the direction noted by the arrow 110, the intake fitting member 102 moves laterally in the direction noted by arrow 112, in relation to the outlet fitting 104.

Further illustrated in FIG. 3, outwardly circumferentially extended portions 136 are disposed on the bottom portion 120. These portions 136 allows for containment means for a sealing member, such as an o-ring. The plurality of apertures 138 are also disposed on the bottom portion 120 of the intake fitting member 102. The apertures 138 provide a section of the liquid flow chamber 134 of FIG. 2 as liquid flows through the inlet portion (not visible) of the intake fitting member 102 and flows through the apertures 138 to channel defined by the interior of the annular sleeve (106 in FIGS. 1 and 2) and the exterior of the intake fitting member 102. Also, the sealing means disposed between the raised portions 136 provide for a backstop directing liquid flow towards a connected outlet fitting member (104 in FIGS. 1 and 2).

Figure 4:
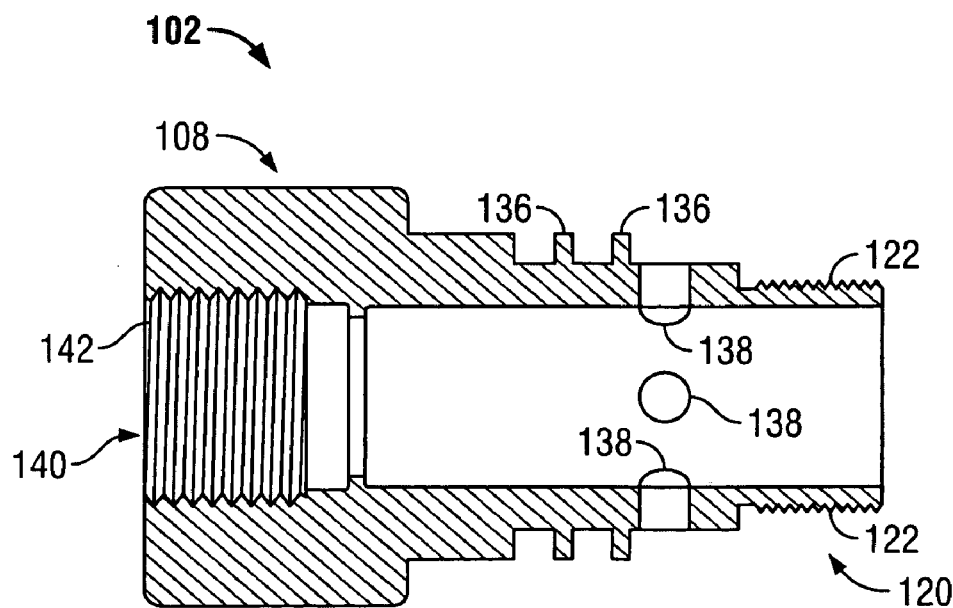
FIG. 4 illustrates a cross-sectional view of the intake fitting member of FIG. 3 along the cross section IV—IV.

FIG. 4 illustrates a cross-sectional view of the intake fitting member 102 of FIG. 3 along the cross-section VI—VI. Visible in the cross-section of FIG. 4, the top portion 108 includes the liquid inlet portion 140. The edge of the liquid inlet portion 140 includes an interior threaded inlet portion 142. The interior threaded inlet portion 142 may be engaged with a threaded inlet pipe fitting in a liquid pipeline such that the liquid flow is received through the liquid inlet portion 140.

Also visible in the cross section of FIG. 4, the apertures 138 are disposed in the bottom portion 120 of the intake fitting member 102. The apertures 138 extend through the intake fitting member 102 and provide a flow path outside of the liquid inlet portion 140. The apertures 138 are disposed posterior to the raised portion 136. The bottom portion threaded section 122 is disposed at the bottom portion 120 such that the intake fitting member 102 may contactingly engage the outlet fitting member (104 of FIGS. 1 and 2), as discussed above in greater detail with respect to FIG. 2.

Figure 5:
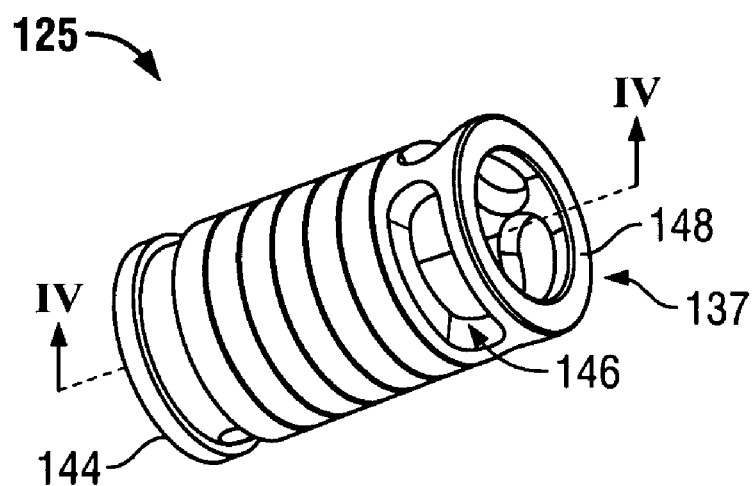
FIG. 5 illustrates a perspective view of a piston.

FIG. 5 illustrates a perspective view of the piston 125 illustrated in the cross-section of FIG. 2. The piston 125 includes a primary face 144, occluded from view based on the perspective of FIG. 5. The primary face 144 includes a flat surface having a primary face aperture (not visible) centrally disposed thereon. The primary face aperture allows for the flow of a liquid therethrough.

The piston 125 further includes the bottom portion 137 having a plurality of circumferentially disposed bottom portion apertures 146. The bottom portion 137 has a shoulder portion 148 which abuts against the compression member (136 of FIG. 2). The bottom portion apertures 146 allows for the passage of liquid flow passing through a center cavity of the piston 125 from the primary face aperture out through apertures 138 in the bottom portion of the intake fitting member of FIGS. 2–4.

Figure 6:
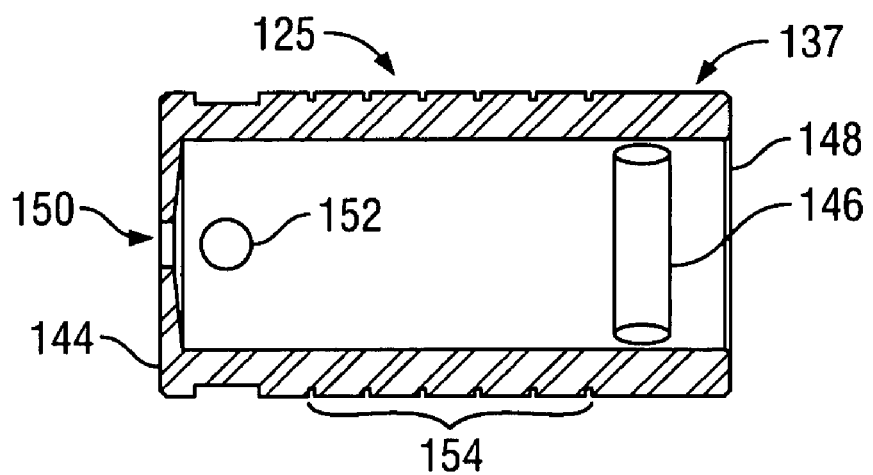
FIG. 6 illustrates a cross-sectional view of the piston of FIG. 5 along the cross section VI—VI.

FIG. 6 illustrates a cross-sectional view of the piston 125 of FIG. 5 across the cross-sectional line IV—IV. As illustrated, the primary face 144 includes a primary face aperture 150. In one embodiment, the piston 125 further includes a channel aperture 152. Furthermore, the exterior of the piston 125 includes grooves 154 circumferentially extending around the piston 125. The bottom portion apertures 146 and shoulder portion 148 are disposed on the bottom portion 137 of the piston 125.

In operation, the piston floats in the liquid flow chamber 134 based on incoming liquid pressure to reach a new equilibrium between the forces on the primary face 144 and compressive forces of the compression member 136. As noted above, when no liquid flow and/or liquid flow pressure exists, the compressive force, the spring, abuts the piston 125 against the intake fitting member 102. When pressure exists, the pressure on the primary face 144 forces the piston 125 downward and the incoming pressure is countered by the compressive force of the compression member 136.

Figure 7:
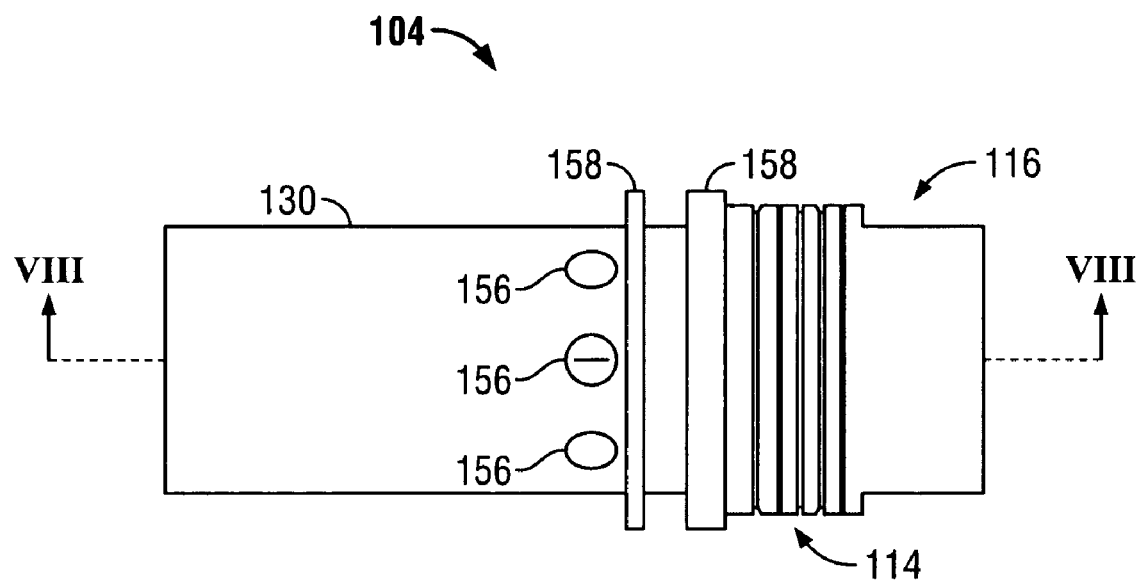
FIG. 7 illustrates a side view of an outlet fitting member.

FIG. 7 illustrates a side view of one embodiment of the outlet fitting member 104. The outlet fitting member 104 includes a top portion 130, the top portion 130 having a plurality of apertures 156. The apertures 156 extend through the exterior of the top portion 130 into a liquid outlet portion (not visible). Outwardly circumferentially extended portions 158 are disposed on the bottom portion 116. These portions 158 allow for contacting engagement of the outlet fitting member relative to the annular sleeve (106 in FIGS. 1 and 2) and also provide containment means for a sealing member, such as an o-ring, which in turn provides a definition to the liquid flow chamber.

The bottom portion 116 of the outlet fitting member 104 further includes the multiple adjustment markings 114. As illustrated in greater detail in FIG. 2, the piston 125 of FIG. 2 is laterally displaced by the intake fitting member (102 of FIGS. 1–4), such that the adjustment markings 114 allows for the relative measurement of the lateral displacement of the piston 125. The lateral displacement directly relates to the liquid flow rate based upon the location of the bottom portion apertures 146 of the piston 125 relative to the plurality of apertures 138 of the intake fitting member 102. As noted above, the inclusion of the compression member 136 engaging the piston 126 and the outlet fitting member 104 allows for the maintenance of a constant fluid flow rate based on any increases in pressure on the primary face 144 of piston are countered by the compression forces of the compression member 136.

Figure 8:
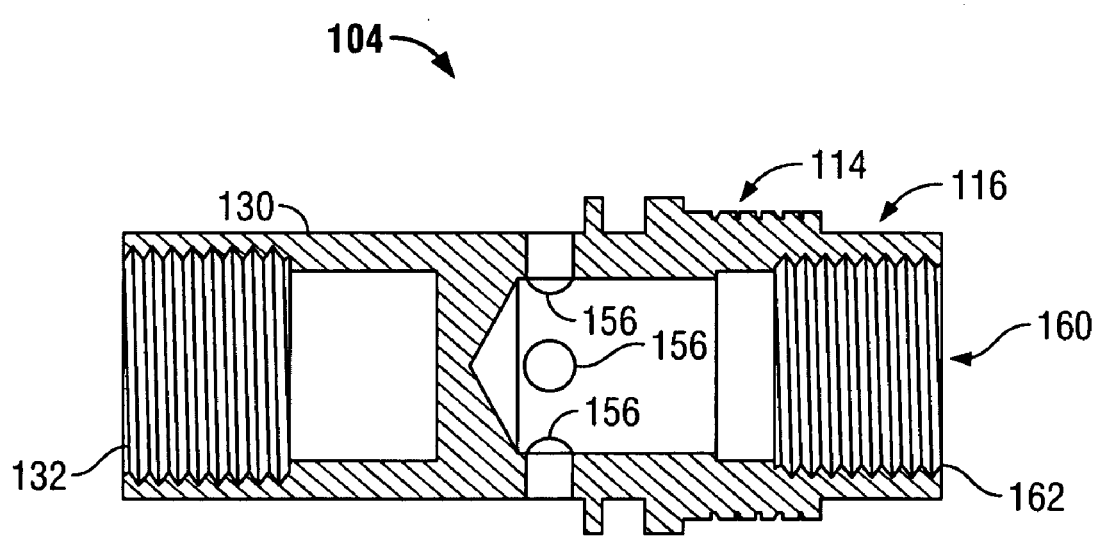
FIG. 8 illustrates a cross-sectional view of an outlet fitting member of FIG. 7 along the cross section VIII—VIII.

FIG. 8 illustrates a cross sectional view of the outlet fitting member 104 along the cross-section VIII—VIII of FIG. 7. Visible in the cross-section is top portion threaded section 132 disposed in the interior of the top portion 130. As discussed above, the top portion thread section 132 contacting engages the bottom portion threaded section 122 (FIGS. 2–4) of the intake fitting member 102 (FIGS. 1–4).

The cross section of FIG. 8 further illustrates the apertures 156 providing a channel between the exterior of the top portion 130 into a liquid flow outlet chamber 160. The bottom portion 116 further includes an interior threaded outlet portion 162. The interior threaded outlet portion 162 may be engaged with a threaded outlet pipe fitting within an exiting pipeline such that a liquid flow received through the apertures 156 into the outlet liquid flow chamber 160 continues flow through the existing pipeline.

As such, the inline liquid flow control valve 100 allows for adjustment of liquid flow rate and the maintenance of a constant liquid flow rate. The valve 100 may be inlinely adjusted, wherein inlinely adjusted includes not having to disconnect the valve 100 from an existing pipeline. Rather, the valve 100 allows for the rotational adjustment of the top portion 108 of the intake fitting member 102. The rotational adjustment therein laterally displaces the piston 125. Lateral displacement of the piston 125 therein adjusts the liquid flow chamber, thereby adjusting a liquid flow rate. Moreover, the compression member 136 disposed between the piston 125 and the outlet fitting member 104 maintains the fluid flow rate by compensating for any increase or decrease of the incoming liquid flow pressure.

Upon rotation of the intake fitting member 102 in relation to the outlet fitting member 104, the forces exerted on the piston 125 by the compression member 136 change. This thereupon adjusts the alignment of the apertures within the piston 125 relative to the outlet fitting apertures. As such, the flow rate of a liquid passing therebetween is adjusted. The change in compressive forces exerted by the compression member 136 on the piston 125 provide for the change in the lateral displacement of the piston 125.

The inline liquid flow rate control valve 100 may be composed of any suitable material capable of withstanding the corresponding pressures within a liquid flow pipeline and capable of withstanding any degrading effects an subsequent liquid may pose, such as highly acidic liquids. Moreover, the inline liquid flow control valve 100 may be utilized in any suitable liquid pipeline system, including but not limited to, a urethane dispensing pipeline.

Furthermore, while the particular preferred embodiments have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the related art.

What is claimed is:

1. An inline liquid flow control valve comprising:
   an intake fitting member including a top portion and a bottom portion, the bottom portion including a bottom portion threaded section and a liquid flow section having a plurality of apertures;
   an outlet fitting member including a top portion having a plurality of apertures, the top portion including a top portion threaded section contactingly engaging the bottom portion threaded section of the intake fitting member;

a piston disposed inside the intake fitting member, the piston having a primary face with a primary face aperture and a bottom portion with a plurality of bottom portion apertures;

a compression member having a top portion engaging the bottom portion of the piston and a bottom portion of an interior channel in the top portion of the outlet fitting member;

an annular sleeve disposed about the intake fitting member and the outlet fitting member; and a liquid flow chamber defined by the plurality of apertures in the intake fitting member, bottom portion apertures in the piston and the plurality of apertures in the outlet fitting member such that a flow rate of liquid through the liquid flow chamber is inlinely adjustable through the positioning of plurality of apertures in the intake fitting member relative to the bottom portion aperture in the piston and the flow rate of the liquid is maintained at a constant flow rate based on the compression member providing a compressive force against the piston.

2. The inline liquid flow control valve of claim 1 wherein the compression member provides a compression force, the compression force based on the engagement of the bottom portion of the piston and the top portion threaded section of the outlet fitting member.

3. The inline liquid flow control valve of claim 1 wherein the top portion of the intake fitting member is rotational to provide engagement of the bottom portion threaded section of the intake fitting member and the top portion threaded section of the outlet fitting member.

4. The inline liquid flow control valve of claim 3 wherein the top portion of the intake fitting member has a plurality of engagement surfaces.

5. The inline liquid flow control valve of claim 3 wherein the engagement of the bottom portion threaded section of the intake fitting member and the top portion threaded section of the outlet fitting member provide compressive forces on the piston.

6. The inline liquid flow control valve of claim 5 wherein the compressive force on the piston adjusts liquid flow rate of liquid through the liquid flow chamber.

7. The inline liquid flow control valve of claim 5 further comprising:
a plurality of adjustment marking disposed on an exterior portion of a bottom portion of the outlet fitting member such that the change on the compressive forces on the piston can be relatively measured.

8. The inline liquid flow control valve of claim 1 further comprising:
an interior threaded inlet portion disposed within the top portion of the intake fitting member such that the intake fitting member may be engaged with a threaded inlet pipe fitting; and
an interior threaded outlet portion disposed on a bottom portion of the outlet fitting member such that the outlet fitting member may be engaged with a threaded outlet pipe fitting.

9. The inline liquid flow control valve of claim 1 wherein a flow rate adjustment is created by the relative position of the inlet fitting to the outlet fitting.

10. The inline liquid flow control valve of claim 1 wherein a flow rate adjustment is created by the relative position of the outlet fitting to the inlet fitting.

11. The inline flow controller of claim 1 wherein a fluid pressure increase on the piston face, is compensated for and countered by the spring compressive forces to maintain a constant fluid flow rate.

12. An inline liquid flow control valve comprising:
an intake fitting member including a top portion and a bottom portion, the bottom portion including a bottom portion threaded section and a liquid flow section having a plurality of apertures;

an outlet fitting member including a top portion having a plurality of apertures, the top portion including a top portion threaded section contactingly engaging the bottom portion threaded section of the intake fitting member;

a piston disposed inside the intake fitting member, the piston having a primary face with a primary face aperture and a bottom portion with a plurality of bottom portion apertures;

a compression member having a top portion engaging the bottom portion of the piston and a bottom portion of an interior channel in the top portion of the outlet fitting member;

an annular sleeve disposed about the intake fitting member and the outlet fitting member;

a liquid flow chamber defined by the plurality of apertures in the intake fitting member, the annular sleeve and the plurality of apertures in the outlet fitting member such that a flow rate of liquid through the liquid flow chamber is inlinely adjustable through the positioning of plurality of apertures in the intake fitting member relative to the interior channel of the outlet fitting member; and the top portion of the intake fitting member being rotational to provide engagement of the bottom portion threaded section of the intake fitting member and the top portion threaded section of the outlet fitting member.

13. The inline liquid flow control valve of claim 12 wherein the compression member provides a compression force, the compression force based on the engagement of the bottom portion threaded section of the intake fitting member and the top portion threaded section of the outlet fitting member.

14. The inline liquid flow control valve of claim 12 wherein the top portion of the intake fitting member has a plurality of engagement surfaces.

15. The inline liquid flow control valve of claim 12 wherein the engagement of the bottom portion threaded section of the intake fitting member and the top portion threaded section of the outlet fitting member provide for the lateral displacement of the piston.

16. The inline liquid flow control valve of claim 15 such that the lateral displacement of the piston adjusts liquid flow rate of liquid through the liquid flow chamber.

17. The inline liquid flow control valve of claim 15 further comprising:
a plurality of adjustment marking disposed on an exterior portion of a bottom portion of the outlet fitting member such that the lateral displacement of the piston may be relatively measured.

18. The inline liquid flow control valve of claim 12 further comprising:
an interior threaded inlet portion disposed within the top portion of the intake fitting member such that the intake fitting member may be engaged with a threaded inlet pipe fitting; and an interior threaded outlet portion disposed on a bottom portion of the outlet fitting member such that the outlet fitting member may be engaged with a threaded outlet pipe fitting.

19. An inline liquid flow control valve comprising:

an intake fitting member including a top portion and a bottom portion, the bottom portion including a bottom portion threaded section and a liquid flow section having a plurality of apertures;

an outlet fitting member including a top portion having a plurality of apertures, the top portion including a top portion threaded section contactingly engaging the bottom portion threaded section of the intake fitting member;

a piston disposed inside the intake fitting member, the piston having a primary face with a primary face aperture and a bottom portion with a plurality of bottom portion apertures;

a compression member having a top portion engaging an interior channel of the bottom portion of the intake fitting member and a bottom portion of an interior channel in the bottom portion of the outlet fitting member;

an annular sleeve disposed about the intake fitting member and the outlet fitting member; and an liquid flow chamber defined by the plurality of apertures in the intake fitting member, the annular sleeve and the plurality of apertures in the outlet fitting member such that a flow rate of liquid through the liquid flow chamber is inlinely adjustable through the positioning of plurality of apertures in the intake fitting member relative to the interior channel of the outlet fitting member.

20. The inline liquid flow control valve of claim 19 wherein the top portion of the intake fitting member is rotational to provide engagement of the bottom portion threaded section of the intake fitting member and the top portion threaded section of the outlet fitting member. And the engagement of the bottom portion threaded section of the intake fitting member and the top portion threaded section of the outlet fitting member provide for the lateral displacement of the piston.

21. The inline liquid flow control valve of claim 20 wherein the lateral displacement of the piston adjusts liquid flow rate of liquid through the liquid flow chamber.

22. The inline liquid flow control valve of claim 21 further comprising:

a plurality of adjustment marking disposed on an exterior portion of a bottom portion of the outlet fitting member such that the change in the compressive forces on the piston can be relatively measured.

* * * * *